US008961313B2

(12) United States Patent
Zalewski

(10) Patent No.: US 8,961,313 B2
(45) Date of Patent: Feb. 24, 2015

(54) MULTI-POSITIONAL THREE-DIMENSIONAL CONTROLLER

(75) Inventor: Gary Zalewski, Oakland, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 665 days.

(21) Appl. No.: 12/475,449

(22) Filed: May 29, 2009

(65) Prior Publication Data

US 2010/0304868 A1    Dec. 2, 2010

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *G11C 11/14* | (2006.01) | |
| *G11C 11/54* | (2006.01) | |
| *A63F 13/20* | (2014.01) | |

(52) U.S. Cl.
CPC ......... *A63F 13/06* (2013.01); *A63F 2300/1006* (2013.01); *A63F 2300/1031* (2013.01); *A63F 2300/1043* (2013.01); *A63F 2300/105* (2013.01); *A63F 2300/1056* (2013.01); *A63F 2300/6045* (2013.01)
USPC .................. 463/38; 463/36; 463/37; 463/39; 365/161; 365/167

(58) Field of Classification Search
None
See application file for complete search history.

(56) References Cited

U.S. PATENT DOCUMENTS 3,943,277 A    3/1976  Everly et al. .................. 348/169
4,263,504 A    4/1981  Thomas ......................... 235/454
4,313,227 A    1/1982  Eder ............................. 398/106

(Continued)

FOREIGN PATENT DOCUMENTS

| EP | 0353200 | 1/1990 | ............... G01S 17/10 |
| EP | 0652686 | 5/1995 | ............... H04R 1/40 |

(Continued)

OTHER PUBLICATIONS

The American Heritage® Dictionary of the English Language, Fourth Edition. S.v. "transect." Retrieved Nov. 23, 2011 from http://www.thefreedictionary.com/transect.*

(Continued)

*Primary Examiner* — Michael Jung
(74) *Attorney, Agent, or Firm* — Martine Penilla Group, LLP

(57) ABSTRACT

Systems and methods are disclosed to control interactivity with a video gaming system. The system includes a game console and a controller that is configured to be held in a plurality of handhold orientations. The controller further includes a handle that extends between a first end and a second end along a length axis and an input feature disposed at the first end. The input feature includes sensors to detect manipulations that cause a relative movement between the input feature and the handle. The manipulations that are detected include torque applied to the input feature about the length axis. Where the detected manipulation are relayed to the game console where the game console correlates the detected manipulation into control of the video game. The gaming system can be primarily executed through a local game console, or the game console (or computing device), can communicate to remote servers, over the internet, to processes primary execution. And, the processing can be for one or more users connected to interactive applications, in a multi-user gaming, communication and/or interactive application.

4 Claims, 12 Drawing Sheets

(56) References Cited

U.S. PATENT DOCUMENTS

| | | | |
|---|---|---|---|
| 4,558,864 A | 12/1985 | Medwedeff | 273/148 B |
| 4,565,999 A | 1/1986 | King et al. | 345/158 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 4,961,138 A | 10/1990 | Gorniak | 364/200 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,186,629 A | 2/1993 | Rohen | 434/114 |
| 5,237,311 A | 8/1993 | Mailey et al. | 340/710 |
| 5,260,556 A | 11/1993 | Lake et al. | 235/494 |
| 5,297,061 A | 3/1994 | Dementhon et al. | 345/180 |
| 5,335,011 A | 8/1994 | Addeo et al. | 348/15 |
| 5,426,450 A | 6/1995 | Drumm | 345/168 |
| 5,455,685 A | 10/1995 | Mori | 348/363 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,616,078 A | 4/1997 | Oh | 463/8 |
| 5,638,228 A | 6/1997 | Thomas, III | 360/60 |
| 5,643,087 A * | 7/1997 | Marcus et al. | 463/38 |
| 5,649,021 A | 7/1997 | Matey et al. | 382/128 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,784,052 A | 7/1998 | Keyson | 345/167 |
| 5,796,354 A | 8/1998 | Cartabiano et al. | 341/22 |
| 5,818,424 A | 10/1998 | Korth | 345/158 |
| 5,850,222 A | 12/1998 | Cone | 345/418 |
| 5,850,473 A | 12/1998 | Andersson | 382/165 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,130,664 A | 10/2000 | Suzuki | 345/158 |
| 6,134,346 A | 10/2000 | Berman et al. | 382/163 |
| 6,151,009 A | 11/2000 | Kanade et al. | 345/641 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,504,535 B1 | 1/2003 | Edmark | 345/419 |
| 6,516,466 B1 | 2/2003 | Jackson | 725/62 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,589,118 B1 * | 7/2003 | Soma et al. | 463/38 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,636,197 B1 * | 10/2003 | Goldenberg et al. | 345/156 |
| 6,661,914 B2 | 12/2003 | Dufour | 382/154 |
| 6,676,522 B2 | 1/2004 | Rowe et al. | 463/42 |
| 6,677,967 B2 | 1/2004 | Swano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,751,338 B1 | 6/2004 | Wallack | 382/106 |
| 6,753,849 B1 | 6/2004 | Curran et al. | 345/156 |
| 6,767,282 B2 | 7/2004 | Matsuyama et al. | 463/3 |
| 6,769,769 B2 | 8/2004 | Podlleanu et al. | 351/221 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,795,068 B1 | 9/2004 | Marks | 345/419 |
| 6,809,776 B1 | 10/2004 | Simpson | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |

(56) References Cited

U.S. PATENT DOCUMENTS

| | | | |
|---|---|---|---|
| 6,965,362 B1 | 11/2005 | Ishizuka | 345/82 |
| 6,970,183 B1 | 11/2005 | Monroe | 348/143 |
| 7,006,009 B2 | 2/2006 | Newman | 340/854.5 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobori et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,274,305 B1 | 9/2007 | Lutrell | 340/870.02 |
| 7,283,679 B2 | 10/2007 | Okada et al. | 382/260 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,364,297 B2 | 4/2008 | Goldfain et al. | 351/206 |
| 7,379,559 B2 | 5/2008 | Wallace et al. | 382/100 |
| 7,435,178 B1* | 10/2008 | Tam et al. | 463/38 |
| 7,446,650 B2 | 11/2008 | Schofield et al. | 340/425.5 |
| 2001/0056477 A1 | 12/2001 | McTernan et al. | 709/219 |
| 2002/0010655 A1 | 1/2002 | Kjallstrom | 705/27 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0126899 A1 | 9/2002 | Farrell | 382/199 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0213419 A1 | 10/2004 | Varma et al. | 381/92 |
| 2004/0254017 A1 | 12/2004 | Cheng | 463/36 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0198095 A1 | 9/2005 | Du et al. | 709/200 |
| 2005/0239548 A1 | 10/2005 | Ueshima et al. | 463/36 |
| 2006/0025217 A1* | 2/2006 | Hussaini et al. | 463/36 |
| 2006/0033713 A1 | 2/2006 | Pryor | 345/158 |
| 2006/0035710 A1 | 2/2006 | Festejo et al. | 463/36 |
| 2006/0106963 A1* | 5/2006 | Sasaki et al. | 710/110 |
| 2006/0154726 A1* | 7/2006 | Weston et al. | 463/37 |
| 2007/0060336 A1 | 3/2007 | Marks et al. | 463/30 |
| 2007/0066394 A1 | 3/2007 | Ikeda et al. | 463/37 |
| 2007/0120834 A1 | 5/2007 | Boillot | 354/103 |
| 2007/0120996 A1 | 5/2007 | Boillot | 384/345 |
| 2008/0004114 A1* | 1/2008 | McVicar et al. | 463/37 |
| 2008/0056561 A1 | 3/2008 | Sawachi | 382/154 |
| 2008/0070684 A1 | 3/2008 | Haigh-Hutchinson | 463/32 |
| 2008/0096657 A1* | 4/2008 | Benoist | 463/36 |
| 2008/0119269 A1* | 5/2008 | Nonaka et al. | 463/32 |
| 2008/0261693 A1 | 10/2008 | Zalewski | 463/31 |
| 2010/0105475 A1* | 4/2010 | Mikhailov et al. | 463/33 |

FOREIGN PATENT DOCUMENTS

| | | | |
|---|---|---|---|
| EP | WO 96/28777 | 9/1996 | G06F 3/033 |
| EP | 0750202 | 12/1996 | G01S 17/00 |
| EP | 1435258 | 7/2004 | A63F 13/04 |
| EP | 1 471 412 A1 | 10/2004 | G06F 3/033 |
| FR | 2814965 | 4/2002 | A63H 30/00 |
| GB | 2206716 | 1/1989 | G06K 17/12 |
| GB | 2206716 | 11/1989 | G06K 7/12 |
| GB | 2376397 | 11/2002 | G06F 3/00 |
| GB | 2388418 | 11/2003 | G06F 3/033 |
| JP | 01-284897 | 11/1989 | G10H 1/34 |
| JP | 06-102980 | 4/1994 | G06F 3/02 |
| JP | 07-311568 | 11/1995 | G06G 5/02 |
| JP | 9-128141 | 5/1997 | G06F 3/033 |
| JP | 9-185456 | 7/1997 | G06F 3/033 |
| JP | H10500516 A | 1/1998 | |
| JP | 11-38949 | 12/1999 | G09G 5/00 |
| JP | 2000-172431 | 6/2000 | G06F 3/033 |
| JP | 2000259856 | 9/2000 | G06T 17/00 |
| JP | 2000350859 | 12/2000 | A63F 13/00 |
| JP | 2001-166676 | 6/2001 | G09B 9/00 |
| JP | 2002369969 | 12/2002 | A63F 13/12 |
| JP | 2004-145448 | 5/2004 | G06T 17/40 |
| JP | 2004145448 | 5/2004 | G06T 17/40 |
| JP | 2005-046422 | 2/2005 | A63F 13/06 |
| WO | WO 99/35633 | 7/1999 | |
| WO | WO 99/26198 | 10/1999 | |
| WO | WO 02/27456 | 2/2002 | G06F 3/00 |
| WO | WO 03/079179 | 9/2003 | G06F 3/033 |
| WO | WO 2005/073838 | 8/2005 | G06F 3/033 |
| WO | WO 2005107911 | 11/2005 | A63F 13/06 |
| WO | WO 2007095082 | 8/2007 | |

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mehara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

(56) References Cited

OTHER PUBLICATIONS

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View", Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2, No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

Logitech, "SpaceBall® 5000", 3Dconnexion 2003, www.3Dconnexion.com.

\* cited by examiner

MULTI-POSITIONAL THREE-DIMENSIONAL CONTROLLER

CLAIM OF PRIORITY

The present application claims priority from (1) U.S. patent application Ser. No. 12/259,181, entitled "DETERMINING LOCATION AND MOVEMENT OF BALL-ATTACHED CONTROLLER", filed on Oct. 27, 2008, (2) U.S. patent application Ser. No. 12/426, 186, titled "CONTROL DEVICE FOR COMMUNICATING VISUAL INFORMATION", filed on Apr. 17, 2009, and (3) U.S. patent application Ser. No. 12/426,186, entitled "CONTROL DEVICE FOR COMMUNICATING VISUAL INFORMATION" filed on Apr. 17, 2009, each of which is herein incorporated by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

However, realistic control of avatars within the virtual world can be difficult. As virtual worlds become more immersive and representative of three-dimensional spaces enabling realistic control of virtual world objects can present challenges.

It is within this context that embodiments of the invention arise.

SUMMARY OF THE INVENTION

Broadly speaking, the present invention allows for three-dimensional control with a multi-positional controller. The multi-positional controller enables control for a variety of applications and simulations while the three-dimensional controller provides an intuitive interface to interact with both two-dimensional and three-dimensional renderings that are the result of a computer programs being executed through a game client.

In one embodiment a game client is a dedicated game console that can be connected to the internet to enable online interactive game play. In such an embodiment the game client executes a locally stored program in order to render interactive entertainment. In another embodiment, a game client is connected to server processing via the internet. In this embodiment, the game client is similar to a terminal where storage and processing of the program is performed at a remote server.

The multi-positional controller includes an input feature and sensors that enable detection of movement of the input feature relative to a handle. In one embodiment, movement of the input feature induced by applied torque normal to the length of the handle is detected. Similarly, relative movement of the input feature toward or away from the handle may also be detected.

In one embodiment a system to control a video game is disclosed. The system includes a game client and a controller that is configured to be held in a plurality of handhold orientations. The controller further includes a handle that extends between a first end and a second end along a length axis and an input feature disposed at the first end. The input feature includes sensors to detect manipulations that cause a relative movement between the input feature and the handle. The manipulations that are detected include torque applied to the input feature about the length axis. Where the detected manipulation are relayed to the game client where the game client correlates the detected manipulation into control of the video game.

In another embodiment a method to provide input to a game console is disclosed. The method includes an operation to activate a controller for the game console. The controller configured to detect input through a plurality of controller interfaces. The plurality of controller interfaces enables operation of the controller in a variety of handhold orientations. Where one of the plurality of controller interfaces detects torque applied to an input feature. In another operation, orientation of the controller is detected. The detected orientation determines which plurality of controller interfaces is operational. In another operation, communications are initiated between the controller and the game console. Still other operations receive a state of the console and map functions of controller interfaces based on the received state of the console and the detected orientation of the controller. Another operation receives input through the mapped controller interfaces and transmits the received input to the game console. In another operation the received input is correlated to control of a computer program being executed by the game console.

In still another embodiment, an interactive game console control system is disclosed. The game console includes a processor to execute program instructions and console communications hardware. Furthermore, a controller is paired with the game console. The controller having a handle that extends between a first end and a second end along a length axis. The controller further having an input feature being proximate to the first end of the handle, the input feature capable of moving relative to the handle. The controller further including controller communications hardware and sensors to detect torque applied to the input feature about the length axis. Wherein the controller communications hardware is configured to transmit sensor data related to movement of the input feature relative to the handle to console communications hardware, where the processor correlates the received sensor data to interaction with the program instructions being executed. The gaming system can be primarily executed through a local game console, or the game console (or computing device), can communicate to remote servers, over the internet, to processes primary execution. And, the processing can be for one or more users connected to interactive applications, in a multi-user gaming, communication and/or interactive application.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 2A, 2B and 2A-1 are different views of a controller, in accordance with one embodiment of the present invention.

DETAILED DESCRIPTION

An invention is disclosed for a multi-positional three-dimensional controller to control computer generated interactivity being executed by a game console. Throughout this description the term "game console" and "game client" should be used interchangeably. Both game console and game client should be broadly construed as a multimedia computing system or entertainment hub. Thus, both the game console and game client include an operating system that enables file management and execution of applications such as, but not limited to, web browsers, multimedia playback of movies, sound recordings and photos along with the ability to execute code to render an interactive video game, communications, online video or text chat, etc.

In the game console embodiment, the console can be viewed as a standalone device capable of storing, executing and rendering an interactive video game without an internet connection. In the game client embodiment, a game client is dependent on an internet connection to server processing because server processing is responsible for storing, executing and rendering the interactive video game. The controller is configured for use in multiple positions in order to provide flexibility regarding how the controller is manipulated and handled. Additionally, because the controller can be used in multiple positions, application and game developers are granted freedom to implement innovative and non-traditional control schemes.

In one embodiment, the three-dimensional controller includes sensors that enable detection of movement of an input feature relative to a handle. Movement of the input feature relative to the handle includes detection of torque applied to the input feature about an axis normal to the length of the handle. The controller further includes sensors that enable detection of movement of the input feature as it is moved toward or away from the handle. The increased interactivity between users and the controller allows programmers to employ more realistic and fanciful control schemes for computer programs being executed by the game console. Furthermore, because the controller can be manipulated in multiple positions or configurations, the input feature can be manipulated using one-hand or two-hands.

Figure 1:
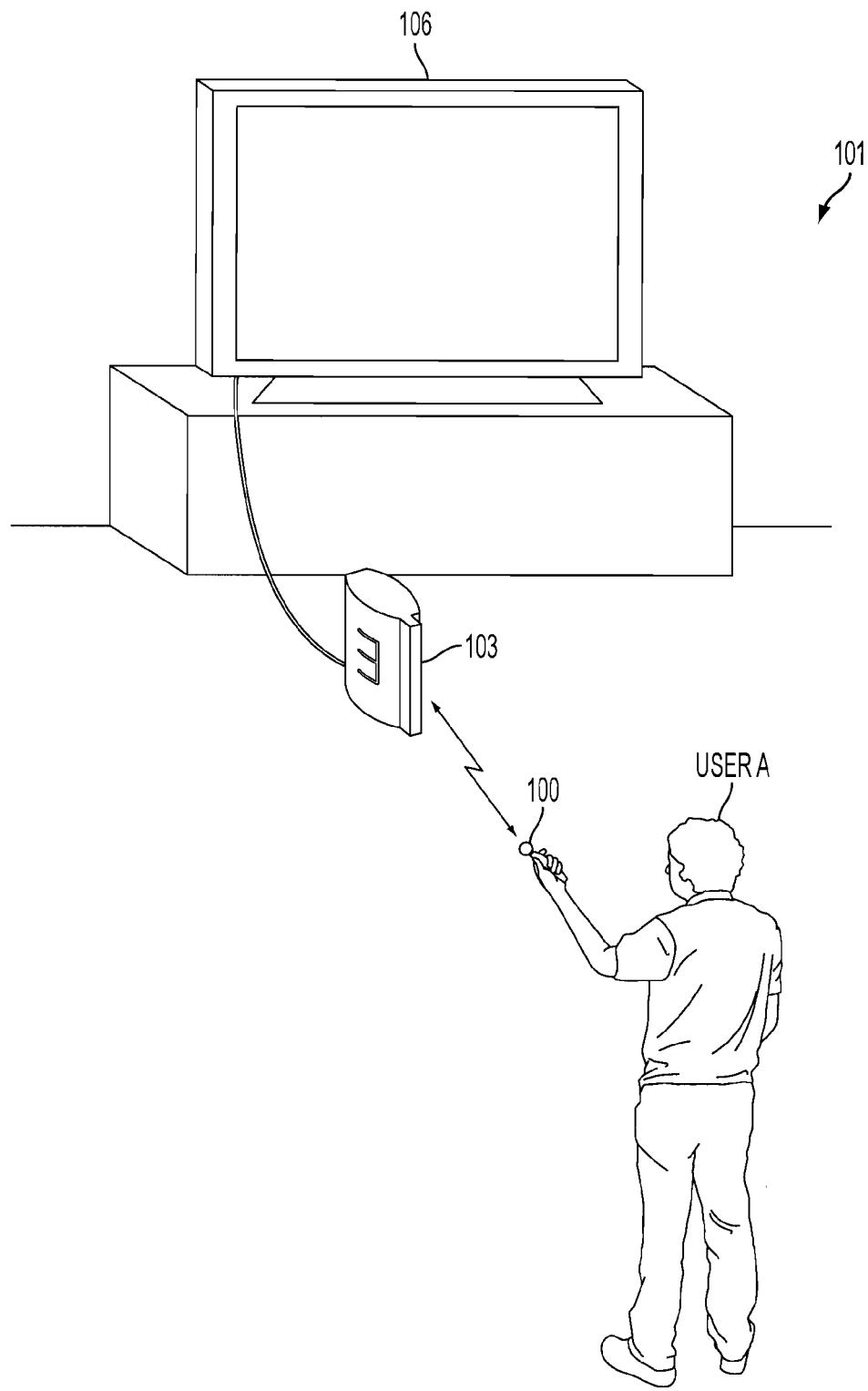
FIG. 1 is an exemplary illustration of a scene that includes user A manipulating a controller along with a game console and a monitor, in accordance with one embodiment of the present invention.

FIG. 1 is an exemplary illustration of a scene 101 that includes user A manipulating a controller 100 along with a game console 103 and a monitor 106, in accordance with one embodiment of the present invention. The monitor 106 displays video output from the game console 103. User A interacts with the game console 103 using the controller 100 to control interactivity, graphics, media, etc. that is displayed on the monitor. In one embodiment, the monitor 106 is a television that is also capable of reproducing audio output from the game console 103. In other embodiments, audio output from the game console 103 is reproduced using multiple speakers to create an immersive multimedia experience.

In one embodiment, the controller 100 communicates with game console 102 using a radio communication protocol such as, but not limited to Bluetooth or one of the protocols defined within the IEEE 802.11 specification. While FIG. 1 shows just single user A with the controller 100, the game console 103 is capable of receiving and processing user input from multiple controllers that are being manipulated by multiple users.

Figures 1, 2A:
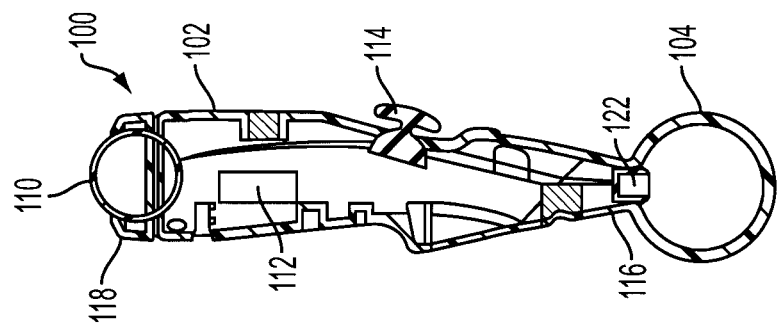
Figure 2B:
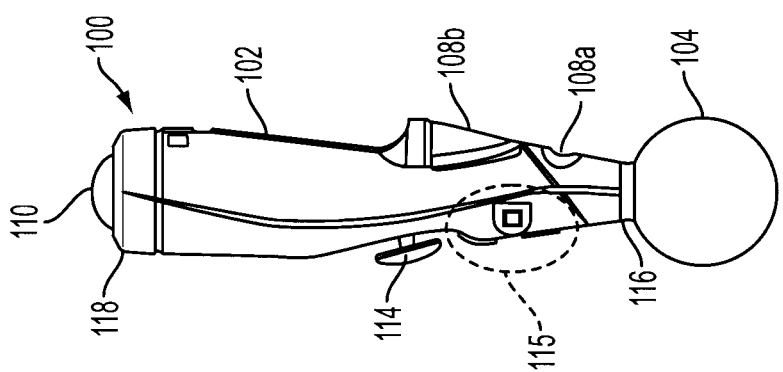
Figure 2A:
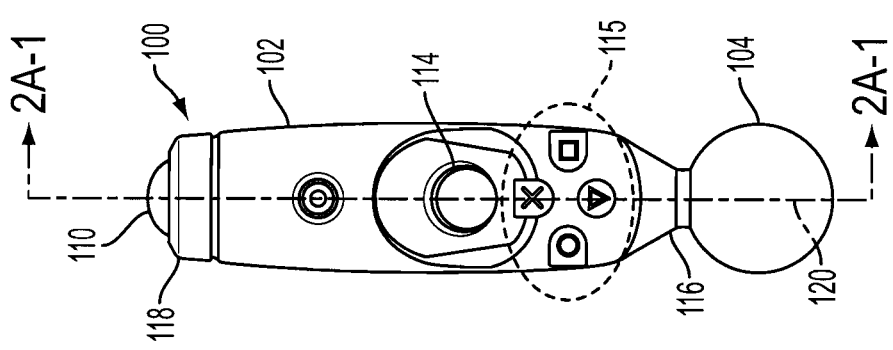

FIGS. 2A, 2B and 2A-1 are different views of a controller 100, in accordance with one embodiment of the present invention. FIG. 2A is a front view of the controller 100. The controller 100 includes a handle 102 that is disposed between a first end 116 and a second end 118. The first end 116 and the second end 118 defining a length axis 120. An input feature 104 is positioned at the first end 116. In one embodiment, the input feature 104 is integrated with the handle 102. In another embodiment, the input feature 104 can be manipulated independent of the handle 102. Located on the front of the controller 100 is input cluster 115. In the embodiment illustrated the input cluster 115 includes four buttons with graphical designations of an "X", a circle, a square, and a triangle. The buttons can be mapped to control various aspects of input to the game console. For example, in one embodiment, pressing the "X" button is mapped to select a highlighted item on the screen. In another embodiment, the "X button can be used to initiate a kick action in a fighting game or fire a weapon in a first person shooter. The other buttons within input cluster 115 can be similarly mapped to perform various functions within interactive video games or other aspects of the game console.

The front of the controller 100 further includes a joystick 114. In some embodiments, the joystick 114 is used to control aspects of a game console such as manipulating an onscreen cursor. In other embodiments, the joystick is used to control movement or actions of onscreen avatars. Located at the second end 118 of the handle 102 is a trackball 110. The inclusion of the trackball 110 is intended to be exemplary and other embodiment of the controller 100 can include different input devices in place of the trackball 110. In still other embodiments, trackball 110 is a modular element than can be swapped with other input devices such as a button cluster similar to input cluster 115.

FIG. 2B is a side view of the controller 100 in accordance with one embodiment of the present invention. The button with the graphical illustration of square from input cluster 115 is visible along with the joystick 114. The side view further illustrates that trigger 108a and trigger 108b are located toward the first end 116 of the handle 102. FIG. 2A-1 is a simplified section view of the controller 100 taken from section line 2A-1 in FIG. 2A. The simplified cross-section view of FIG. 2A-1 illustrates that in one embodiment, the input feature 104 is configured to move about pivot point 122. The cross-section view also illustrates hardware 112. The hardware 112 is intended to simplistically represent hardware including, but not limited to sensors, processors, batteries, and radios within the controller 100. For example, included within the hardware 112 is a radio to transmit user input to the game console. Similarly, sensors and processors associated with the joystick 114 and the input cluster 115 are also found in the hardware 112. Furthermore, the hardware 112 includes motion detection sensors such as gyroscopes, accelerometers, magnetometers, that are used to determine relative movement and orientation of the controller 100 within a three-dimensional space.

Figure 3A:
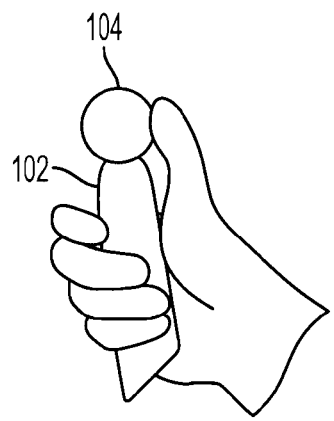
FIGS. 3A-3C illustrate one method of single-handed operation of the controller, in accordance with one embodiment of the present invention.
Figure 3B:
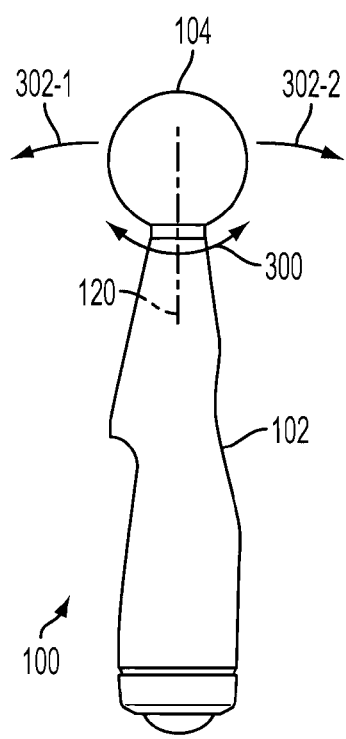
Figure 3C:
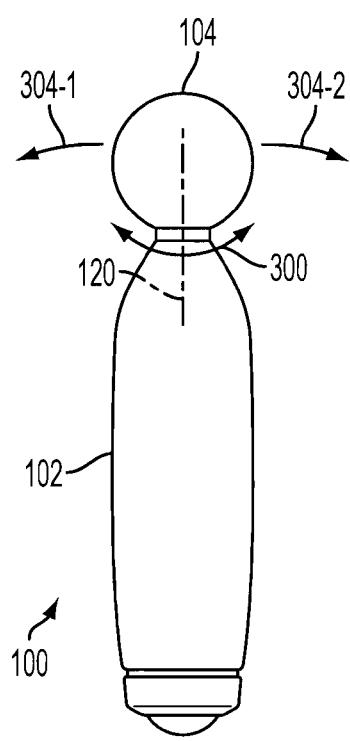

FIGS. 3A-3C illustrate one method of single-handed operation of the controller 100, in accordance with one embodiment of the present invention. FIG. 3A illustrates the controller 100 being held in a "lollipop mode" with the handle 102 being grasped by four fingers of a user while the thumb is placed on the input feature 104. The motion detection sensors within the controller 100 are able to determine the orientation of the controller 100 and automatically enable and disable various aspects of the controller. For example, depending on the configuration of the controller, various joysticks, button inputs or triggers may be enabled or disabled automatically. However, in other embodiments, a particular application may override the disabling of particular inputs as the application developer mapped a particular control to the previously disabled input. FIG. 3B is a side view of the controller 100 and FIG. 3C is a front view of the controller 100. Together, FIG. 3B and FIG. 3C illustrate how the input feature 104 can be manipulated during single-handed operation to control pitch, yaw and roll within a three-dimensional environment. In embodiments where the controller 100 is used within a two-dimensional application the various input features can be mapped to control other items or aspects of the two-dimensional application.

In the side view shown in FIG. 3B, the input feature 104 is manipulated with the thumb in direction 302-1 and direction 302-2. In some embodiments, movement in direction 302-1 or direction 302-2 is mapped to control pitch of an on screen avatar or object being controlled. The type of control (pitch, yaw, or roll) discussed in regards to directional movement of the input feature 104 is intended to be illustrative of one type of control and should not be construed as restrictive. The examples provided are intended to illustrate the capabilities of the input feature 104 to accept user input to control an object within two-dimensional or three-dimensional space. Software developers may be more determinative of the actual mapping of the user input to control of on screen avatars or menus based on the type of controls required for an application. To effectuate the motion in direction 302-1 a user presses their thumb on the input feature 104 so the input feature 104 rotates about the pivot point in the direction 302-1. Similarly, motion in the direction 302-2 can be imparted on the input feature 104 by drawing the thumb backward in the direction 302-2.

Still in the side view of FIG. 3B, the thumb can rotate the input feature 104 about the length axis 120 to create torque 300. In one embodiment, torque 300 is detected optically using a shaft encoder. In another embodiment, torque 300 is detected using a potentiometer. In still another embodiment, strain gauges are used to determine torque 300 applied to the input feature 104 about the length axis 120. Regardless of how torque 300 is detected, in one embodiment, torque 300 can be used to control roll of a game avatar about the length axis 120. In other embodiments, torque 300 can be applied to various control aspects of a Graphical User Interface (GUI) such as, but not limited to scrolling or browsing through menu items.

As the torque 300 to the input feature 104 is a vector with both force and direction, the relative force applied to the input feature 104 can be detected and used to vary control responses of on screen elements. For example, in an embodiment where torque 300 is used to control roll of an on-screen airplane avatar, the torque 300 applied to the input feature 104 controls the roll rate of the airplane avatar. Thus, the greater the torque 300 applied to the input feature 104, the faster the roll rate of the airplane avatar. Likewise, when torque 300 is used to control scrolling of a GUI, the greater the torque 300, the faster the scroll rate.

FIG. 3C is a front view of the controller 100 similar to the view seen in FIG. 2A however, for simplicity the control features on the handle 102 in FIG. 2A are not present in FIG. 3C. Torque 300 may still be applied to the input feature 103 to control roll about the length axis 120. Additionally, the input feature can be manipulated in direction 304-1 and direction 304-2. In one embodiment, the game console correlates manipulation of the input feature 104 in the direction 304-1 to the three-dimensional movement of yaw-left. Similarly, manipulation of the input feature 104 in the direction 304-2 can be correlated to yaw-right. In an embodiment where the controller 100 is used to navigate a GUI, direction 304-1 and direction 304-2 can correlate to respective horizontal scrolling left and right.

The hand positioning illustrated in FIG. 3A is not inclusive of all the single-handed handholds of the controller 100. For example, in another embodiment of lollipop mode, both the thumb and the index finger, or second finger, can simultaneously be used to manipulate the input feature 104.

Figure 4A:
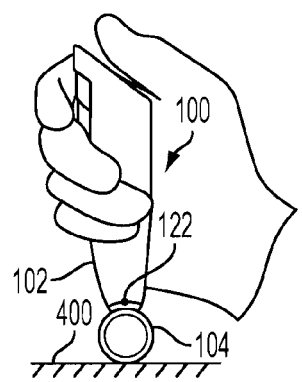
FIGS. 4A-4C illustrate another method of single-handed operation of the controller in accordance with one embodiment of the present invention.
Figure 4B:
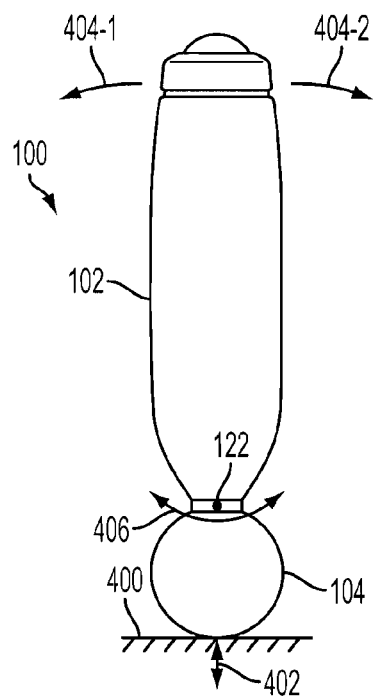
Figure 4C:
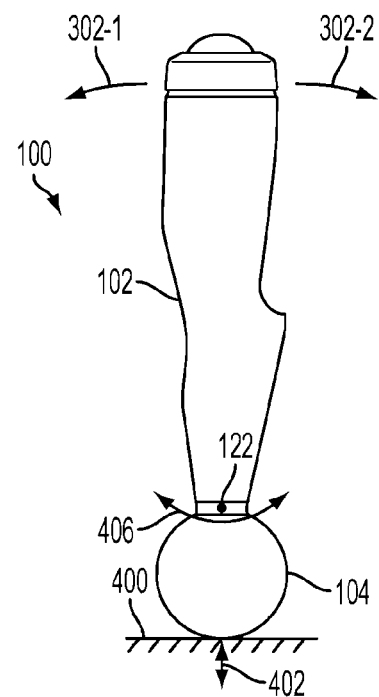

FIGS. 4A-4C illustrate another method of single-handed operation of the controller 100 in accordance with one embodiment of the present invention. FIG. 4A illustrates the controller 100 being held in a "joystick mode" that places the input feature 104 on a surface 400. In joystick mode the input feature 104 is placed against the surface 400 and the handle 102 is moved relative to the pivot point 122 between the input feature 104 and the handle 102. While the surface 400 is illustrated as being flat, the input feature 104 can be placed on curved and compound surfaces. The motion detection hardware can automatically detect when the controller has entered joystick mode based on the orientation of the handle 102 and the pressure applied to the input feature 104. The automatic detection of joystick enables various aspects of the controller 100 such as any input element mounted on the second end of the handle 102. Likewise, automatic entry into joystick mode can disable other aspects of the controller such as, but not limited to, input clusters near the first end of the handle.

FIG. 4B illustrates a front view of the controller 100 in joystick mode and FIG. 4C illustrates a side view of the controller 100 in joystick mode in accordance with one embodiment of the present invention. For simplicity the handle 102 is shown without additional input. In one embodiment movement of the handle 102 about the pivot point 122 in direction 404-1 and direction 404-2 results in controlling roll right and roll left respectively. Similarly, applying torque 405 to the handle 102 relative to the pivot point 122 is used to control yaw. In FIG. 4C, movement of the handle 102 in direction 302-1 and 302-2 results in control of pitch forward and pitch backwards respectively. Additionally, the handle 102 can be pushed toward the surface as indicated by direction 402. In one embodiment, applying downward pressure on the handle 102 toward the input feature 104 creates compression. Sensors between the input feature 104 and the handle 102 enable detection of changes in the applied pressure that can be mapped to control of a computer program.

Figure 5A:
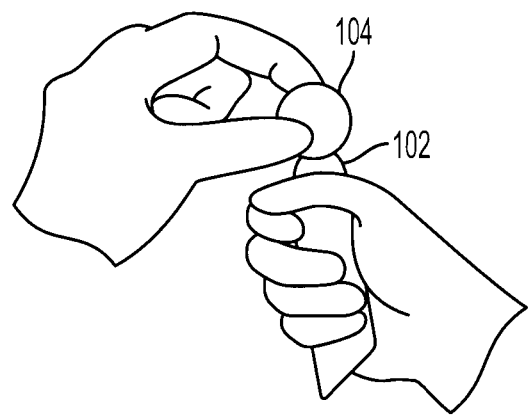
FIGS. 5A-5C illustrate a method of two-handed operation of the controller, in accordance with one embodiment of the present invention.
Figure 5B:
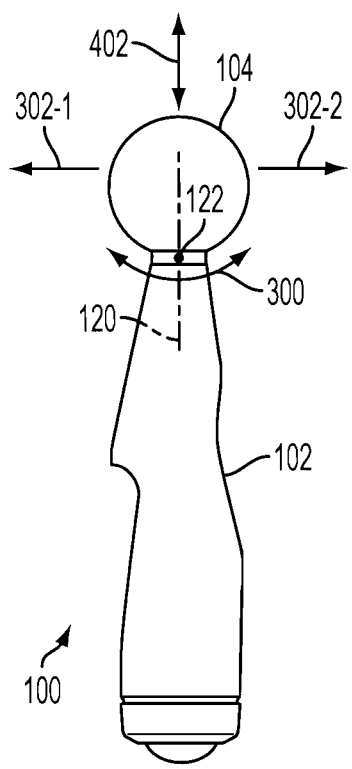
Figure 5C:
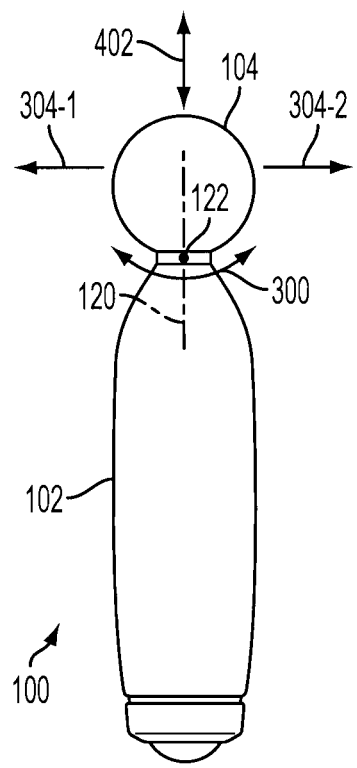

FIGS. 5A-5C illustrate two-handed operation of the controller 100, in accordance with one embodiment of the present invention. In this embodiment, the handle 102 is grasped in one hand and a second hand manipulates the input feature 104. FIG. 5B illustrates a side view of the controller 100 and the relative directions the input feature 104 can be moved relative to the handle 102, about the pivot point 122. In the following description, the movements associated with relative movement of the input feature 104 will be described relative to movement of a human avatar within a virtual world. The particular examples provided below are not intended to be restrictive. In other embodiments, the same relative movements of the input feature 104 can be mapped to various controls of a virtual world object, cursor, operating system navigation, video playback, audio playback, or other aspect of multimedia control through a game console.

Using a human avatar analogy, movement of the input feature 104 in direction 302-1 and 302-2 is detected and mapped to correspond with nodding of the head. Thus, movement in direction 302-1 would pitch the head forward as if bringing the chin closer to the next. Conversely, movement in direction 302-2 would pitch the head backwards, moving the chin away from the neck. Likewise, applying torque 300 to the input feature about the length axis 120 can be mapped to correlate to swiveling the head left or right.

FIG. 5C is a front view of the controller 100 and illustrates that the input feature 104 can be moved in direction 304-1 and 304-2. Continuing with the human avatar analogy, movement of the input feature 104 in direction 304-1 would result in the avatar's head tilting to the left. Similarly, movement of the input feature 104 in direction 304-2 results in the avatar's head tiling to the right. In the two-handed configuration illustrated in FIGS. 5A-5C, the input feature 104 can also be pushed and pulled in the direction 402. In this embodiment, neutral pressure on the input feature 104 in direction 402 results in the human avatar walking up right. Applying pressure to compress the input feature 104 toward the handle 102 is used to make the avatar crouch, while applying tension, or pulling the input feature 104 away from the handle 102 makes the avatar jump. In other embodiments, applying tension to the input feature 104 away from the handle 102 elevates the avatar as if the avatar was standing on the tips of their toes.

As discussed in FIGS. 2A and 2B, various other input features such as triggers, buttons, trackballs, and joysticks can be implement on the controller 100. In the embodiments discussed in FIGS. 3A-3C, 4A-4C, and 5A-5C, combination of input via movement of the handle 102 relative to the input feature 104 or vice versa, in combination of input via a button, trigger, joystick, or trackball can be detected and mapped to various different controls. Another type of adjustment can be "gearing", which is configured to dynamically change a rate of change to an input, command, action, movement or trigger. The gearing can be changed or adjusted by the system via a program, by the user, or depending on the conditions of the interfacing with a computer program, Thus the "force", "torque", "strain", or other inputs can be geared. In game play environments, the gearing can work to adjust the input (based on a gearing profile), so that changes or control are smooth or transition in a realistic manner. For more information on gearing, reference can be made to application Ser. No. 11/382,036, entitled "Method and System for Applying Gearing Effects to Visual Tracking", filed on May 6, 2006, and which is herein incorporated by reference.

As previously discussed in FIGS. 5A-5C, movement of the input feature 104 can be mapped to movement of a virtual avatar. Combining the use of triggers 108a and 108b from FIG. 2B with movement of the input feature 104 can result in additional control of a virtual world avatar.

Thus, in one embodiment, the hand holding the handle 102 can depress a trigger integrated with the handle 102 while the second hand manipulates the input feature 104. In such an embodiment, movement of the input feature 104 in direction 302-1 or direction 302-2 results in the avatar walking forward and backwards respectively. Similarly, applying torque 300 to the input feature 104 while depressing a trigger results in the avatar turning left or right and movement in direction 304-1 or direction 304-2 has the avatar sidestep, or "strafe", left or right. In the embodiment described above, the ability to control both movement of the avatar within the virtual world and movement of the avatar's head with a single controller can increase the realism of the simulation. In other embodiments, including those for controller configurations described in FIGS. 3A-3C and 4A-4C, additional input combinations can be applied to provide a more immersive and realistic simulation.

Figure 6:
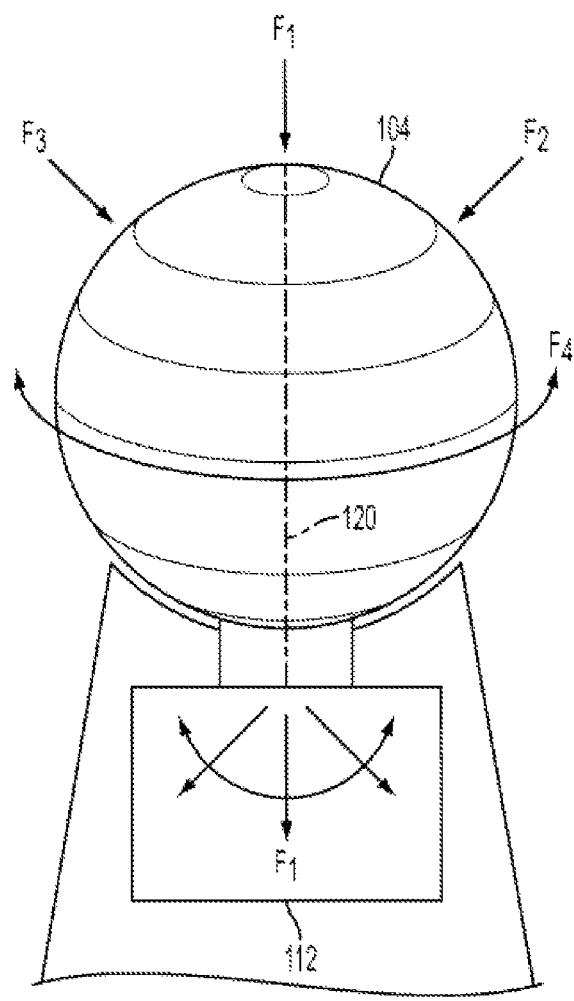
FIG. 6 is an exemplary illustration of various forces being applied to the input feature along with corresponding forces detected by hardware, in accordance with one embodiment of the present invention.

FIG. 6 is an exemplary illustration of various forces being applied to the input feature 104 along with corresponding forces detected by hardware 112, in accordance with one embodiment of the present invention. Force $F_1$ represents a vertical force on the input feature 104. As previously discussed, vertical forces such as $F_1$ can be detected when the force directs the input feature 104 toward the handle 102 or when the force moves the input feature 104 away from the handle 102. In one embodiment, the hardware 112 includes a strain gauge or load cell to detect $F_1$. Similarly, lateral forces or combination of vertical forces and lateral forces such as $F_2$ and $F_3$ can be detected using additional load cells or strain gauges. In one embodiment hardware 112 includes a shaft encoder to detect torque applied to the input feature about the length axis, shown as $F_4$. This embodiment would allow the input feature 104 to freely spin about the length axis and not be subject to lock up at an extreme position. In another embodiment, hardware 112 includes a potentiometer to detect torque applied to the input feature about the length axis.

In either embodiment or torque detection, the hardware 112 is configured to detect combinations of forces from a plurality of directions. This allows compound movements of the input feature relative to the handle, or vice versa, to be detected and correlated to control commands. Thus, combination of forces such as simultaneous application of $F_3$ and $F_4$ can be detected and correlated to control commands. Additionally, the hardware 112 can include force feedback that is capable of increasing or decreasing resistance of the input feature to any applied torque.

Figure 7:
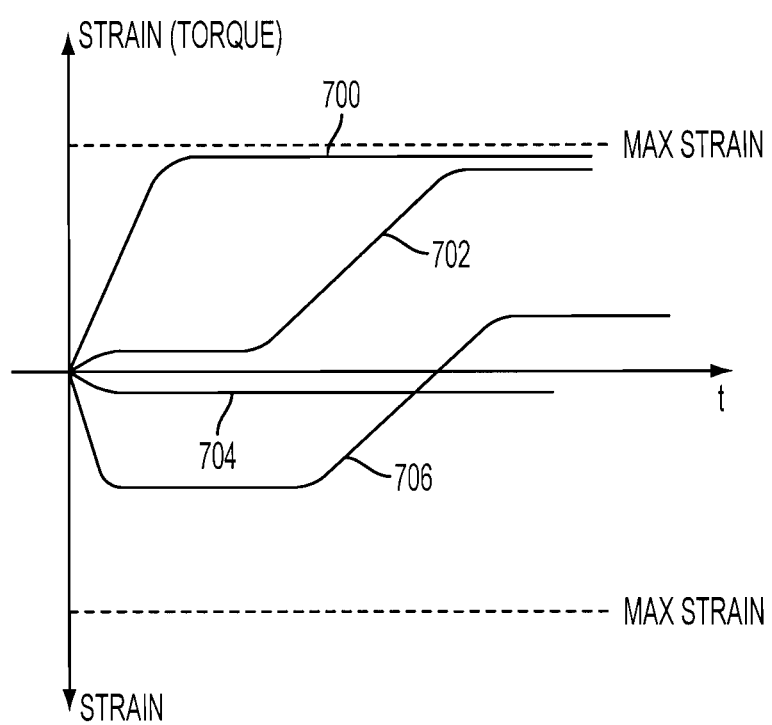
FIG. 7 is an illustration of various strain measurements as a function of torque applied to the input feature, in accordance with one embodiment of the present invention.

FIG. 7 is an illustration of various strain measurements applied as torque to the input feature about the length axis as a function of time, in accordance with one embodiment of the present invention. The origin indicates an absence of torque applied to the input feature while the Max Strain limits indicate the maximum detected torque that can be measured by the hardware. FIG. 7 includes two Max Strain limits because torque can be applied to the input feature in both directions about the length axis. Torque curves 700, 702, 704 and 706 are exemplary torque curves that are intended to be illustrative of various type of interactive control.

For example, torque curve 700 indicates that torque is applied relatively quickly to the input feature and maintained for an extended period. In one embodiment, the torque curve 700 can be indicative of a user quickly scrolling through files stored on a local or network drive. For example, the user may be scrolling through music files or music albums that are available for purchase through an online store. In another embodiment, the torque curve 700 is correlated to the throttle response of a virtual world vehicle such as a car or airplane. Torque curve 702 illustrates that a relatively low torque is applied for a brief period followed by a period of increased torque. Again, correlating the torque to control of a GUI, the relatively low torque period is correlated to slow scrolling while the increased torque is correlated to accelerated scrolling that eventually achieves a fastest scroll speed when the Max Strain is applied.

Torque curve 704 is illustrative of torque being applied in a direction opposite the direction applied in torque curves 700 and 702. With torque curve 704, a low magnitude torque is applied relatively slowly which can be correlated to slow scrolling in the GUI embodiment. In another embodiment, torque curve 704 can be correlated to a slow roll rate of a virtual aircraft, or lightly applying the brakes of a virtual vehicle. Torque curve 706 begins with torque being initially quickly applied in a first direction only to have the direction reversed. Retuning to the control of the throttle of a virtual vehicle, torque curve 706 is illustrative of sudden acceleration followed by a period of constant throttle, followed by braking. In the embodiment where torque is controlling a GUI, torque curve 706 is indicative of browsing in one direction, then choosing to browse in the opposite direction. The particular embodiments of the torque curves in FIG. 7 are intended to be illustrative and the various embodiments discussed above are not intended to be restrictive.

Figure 8A:
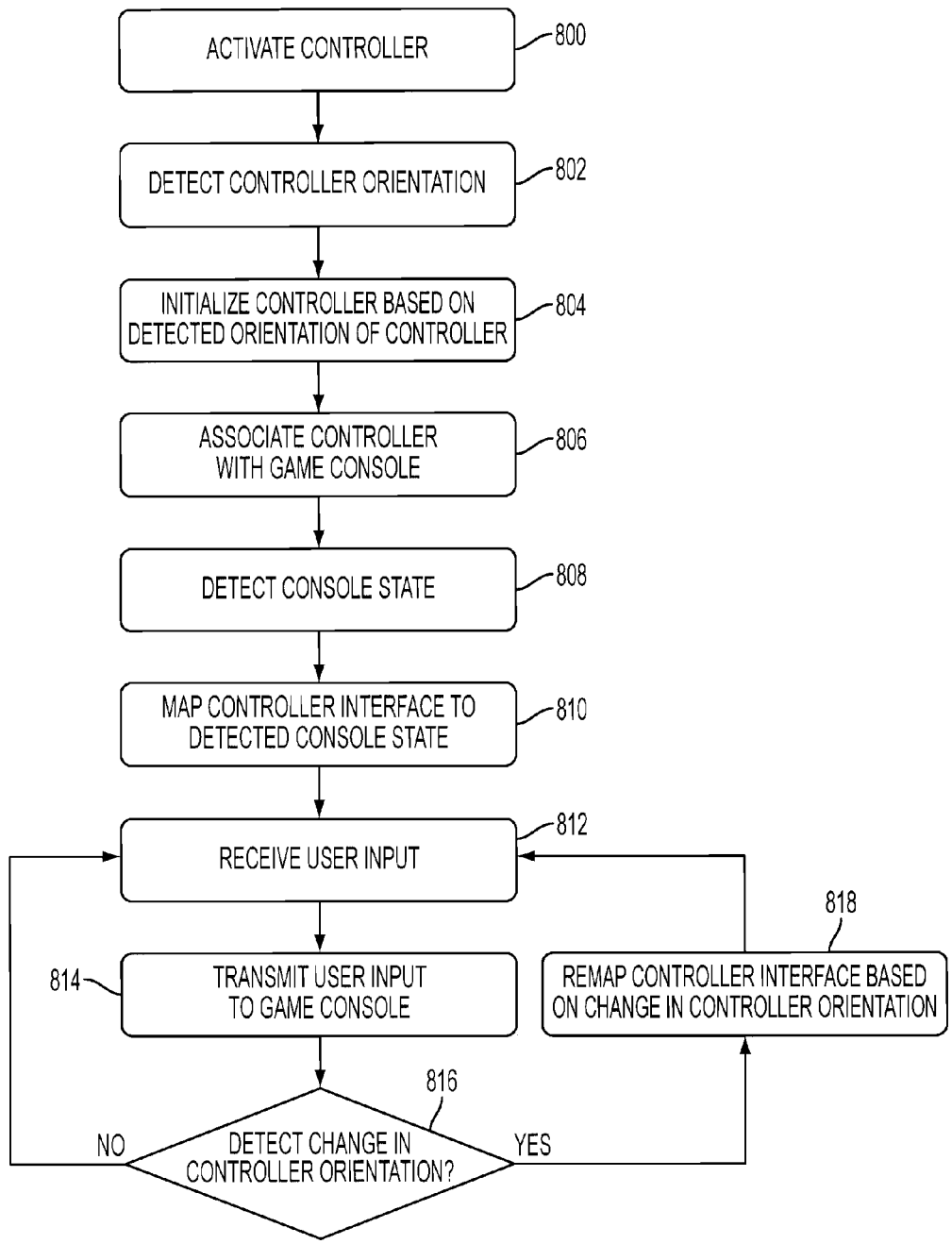
FIG. 8A is an exemplary flow chart that illustrates operation of the controller with the input feature, in accordance with one embodiment of the present invention.

FIG. 8A is an exemplary flow chart that illustrates operation of the controller with the input feature, in accordance with one embodiment of the present invention. Operation 800 activates the controller while operation 802 detects the controller orientation. It may be necessary to detect the controller orientation if the controller is configured for use in multiple positions. Operation 804 initializes the controller based on the detected orientation of the controller. This operation enables a default configuration of buttons, triggers, and joysticks based on the detected orientation of the controller. Thus, if operation 804 detects that the controller is being held in joystick mode, as shown in FIGS. 2A and 2B, the default configuration may disable the input cluster 114. Operation 806 associates the controller with the game console. This operation is used in embodiments where the controllers are wirelessly paired with the console. This association minimizes interference that could occur when pairing multiple controllers with a game console.

Operation 808 is where the controllers receive the game console state and operation 810 maps the controller input to the received console state. In various embodiments, the various console states include, but are not limited to operating system functions, such as navigating a file system or launching applications such as stand alone or networked interactive video games, an internet browser, social networking interfaces, video playback, and audio playback. The particular applications listed are exemplary and are not intended to be limiting. In one embodiment, execution of operation 810 overrides the default configuration initialized in operation 804. This allows individual applications to map controls of the application to particular input to the controller. Furthermore, the phrase "game console" should be construed to encompass not only execution of program instructions that render an interactive video game, but further include operations and functions of general computing, interactivity and multimedia interactivity.

With operation 812 the controller receives input from the user and operation 814 transmits the user input to the game console. If operation 816 detects a change in the controller orientation operation 818 remaps the controller input based on the detected orientation. If operation 816 does not detect a change in the controller orientation operation 812 is executed.

Figure 8B:
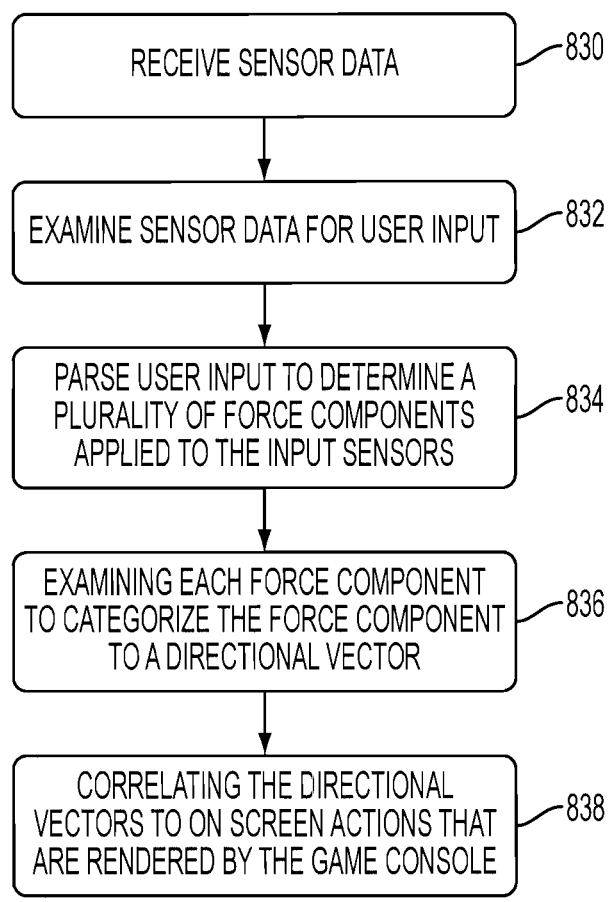
FIG. 8B is an exemplary flow chart illustrating additional operations that are executed when the controller receives user input, in accordance with one embodiment of the present invention.

FIG. 8B is an exemplary flow chart illustrating additional operations that are executed when the controller receives user input, in accordance with one embodiment of the present invention. Operation 830 receives sensor data from the various input sensors that are active based the respective orientation of the controller and the console state. This sensor data can include, but is not limited to, buttons, triggers, joysticks, relative movement of the input feature, and the motion sensors. Operation 832 examines the input sensor data for intentional user input. This operation examines the received sensor data for changes in the sensors data that are representative of intentional user input. In some embodiments user input may need to exceed a threshold value before the input is registered intentional. This can be useful when determining movement from motion sensors such as gyroscopes, magnetometers and potentiometers as slight hand movements may not necessarily be intended as input.

Operation 834 parses the user input to determine a plurality of force components that are being applied to the input sensors. In some embodiments there is only a single force component being applied to a single input sensor, but in for clarity, the controller is configured to detect multiple simultaneous force components through multiple input sensors. With respect to the input feature, the forces applied can be combinations of torque about the length axis, moments about the pivot point and pressure toward and away from the pivot point. Additionally, forces can also be simultaneously applied to other input sensors such as buttons, triggers, or joysticks.

Operation 836 examines each force component to categorize the force component to a direction vector. Gearing can also be applied to the direction vectors, to make adjustments consistent with the input environment or program. Operation 836 deconstructs the real-world physical action of applying force to the controller into individual force components.

Thus, force being applied to a trigger is categorized as a vector along with a simultaneous twist of the input feature about the length axis. Similarly, data from motion detectors such as accelerometers and magnetometers can be examined to determine force components based on movement of the controller. Operation 838 correlates the directional vectors determined in operation 836 to on screen actions that are rendered by the game console. Thus, operation 838 correlates real world physical actions performed with the controller in order to control aspects of the game console. In one embodiment, the correlation is performed using processors within the hardware of the controller. In another embodiment, processors within the game console perform the correlation of operation 838. In either embodiment, physical actions performed by a user in the real-world are detected and translated into controls for the virtual world rendered by the game console.

Figure 9:
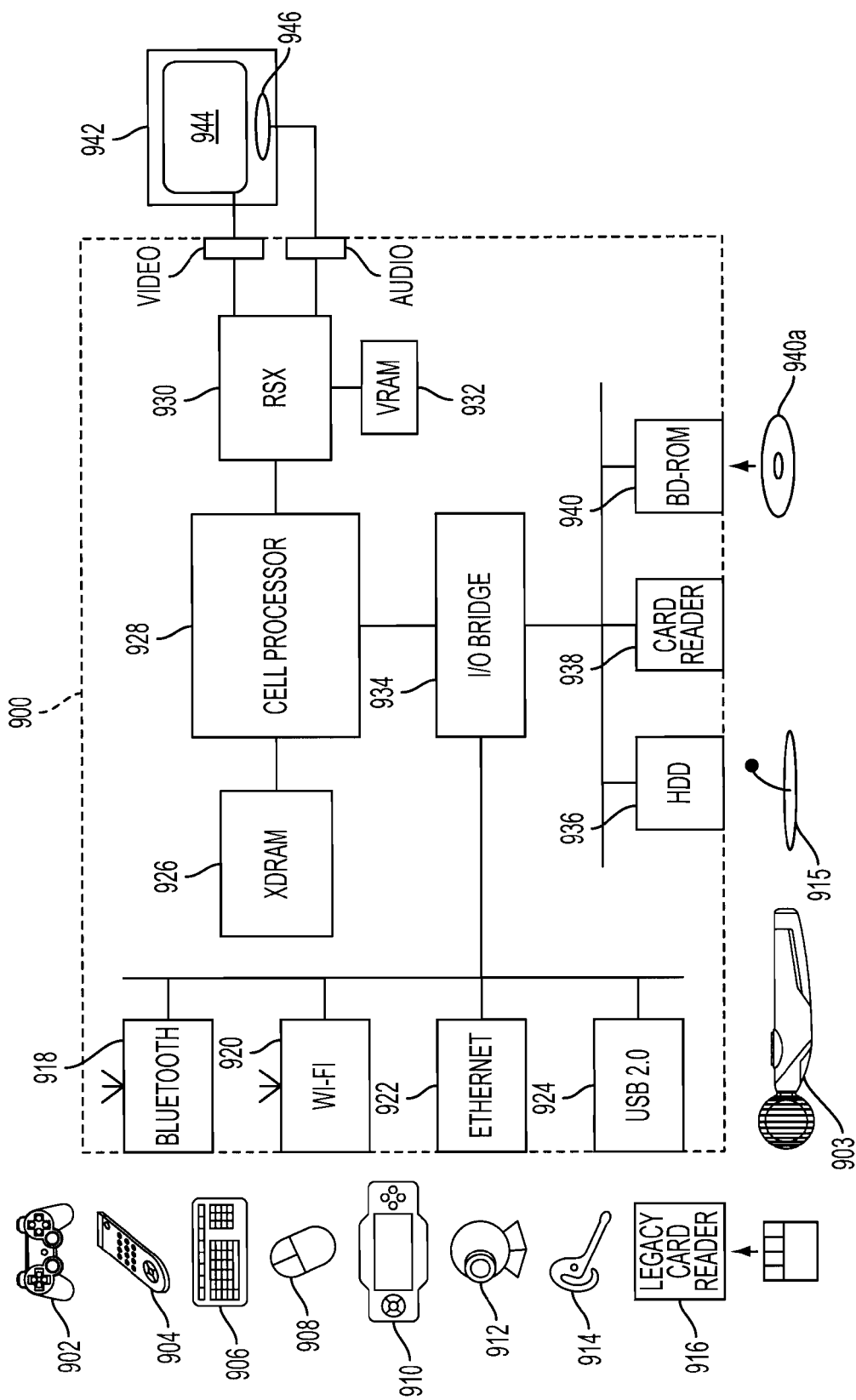
FIG. 9 illustrates hardware and user interfaces that may be used to determine controller location, in accordance with one embodiment of the present invention.

FIG. 9 schematically illustrates the overall system architecture of the Sony® Playstation 3® entertainment device, a game console that may be compatible for implementing a three-dimensional controller in accordance with one embodiment of the present invention. A system unit 900 is provided, with various peripheral devices connectable to the system unit 900. The system unit 900 comprises: a Cell processor 928; a Rambus® dynamic random access memory (XDRAM) unit 926; a Reality Synthesizer graphics unit 930 with a dedicated video random access memory (VRAM) unit 932; and an I/O bridge 934. The system unit 900 also comprises a Blu Ray® Disk BD-ROM® optical disk reader 940 for reading from a disk 940a and a removable slot-in hard disk drive (HDD) 936, accessible through the I/O bridge 934. Optionally the system unit 900 also comprises a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924; a gigabit Ethernet port 922; an IEEE 802.11b/g wireless network (Wi-Fi) port 920; and a Bluetooth® wireless link port 918 capable of supporting of up to seven Bluetooth connections.

In operation, the I/O bridge 934 handles all wireless, USB and Ethernet data, including data from one or more game controllers 902 and 903. For example when a user is playing a game, the I/O bridge 1434 receives data from the game controller 902 or 903 via a Bluetooth link and directs it to the Cell processor 928, which updates the current state of the game accordingly.

The wireless, USB and Ethernet ports also provide connectivity for other peripheral devices in addition to game controllers 902 and 903, such as: a remote control 904; a keyboard 906; a mouse 908; a portable entertainment device 910 such as a Sony Playstation Portable® entertainment device; a video camera such as an EyeToy® video camera 912; a microphone headset 914. Such peripheral devices may therefore in principle be connected to the system unit 900 wirelessly; for example the portable entertainment device 910 may communicate via a Wi-Fi ad-hoc connection, whilst the microphone headset 914 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 916 may be connected to the system unit via a USB port 924, enabling the reading of memory cards of the kind used by the Playstation® or Playstation 2® devices.

In the present embodiment, the game controllers 902 and 903 are operable to communicate wirelessly with the system unit 900 via the Bluetooth link. However, the game controllers 902 and 903 can instead be connected to a USB port, thereby also providing power by which to charge the battery of the game controllers 902 and 903. Game controllers 902 and 903 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 902 is a controller designed to be used with two hands and game controller 903 is multi-positional controller as previously described. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 comprises controls suitable for the operation of the Blu Ray™ Disk BD-ROM reader 940 and for the navigation of disk content.

The Blu Ray™ Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the Playstation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors may include conventional analogue and digital outputs whilst the video connectors may variously include component video, S-video, composite video and one or more High Definition Multimedia Interface (HDMI) outputs or DisplayPort outputs. Consequently, video output may be in formats such as PAL or NTSC, or in 720p, 1080i or 1080p high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 900, an appropriate piece of software such as a device driver should be provided. Device driver technology is well-known and will not be described in detail here, except to say that the skilled man will be aware that a device driver or similar software interface may be required in the present embodiment described.

Figure 10:
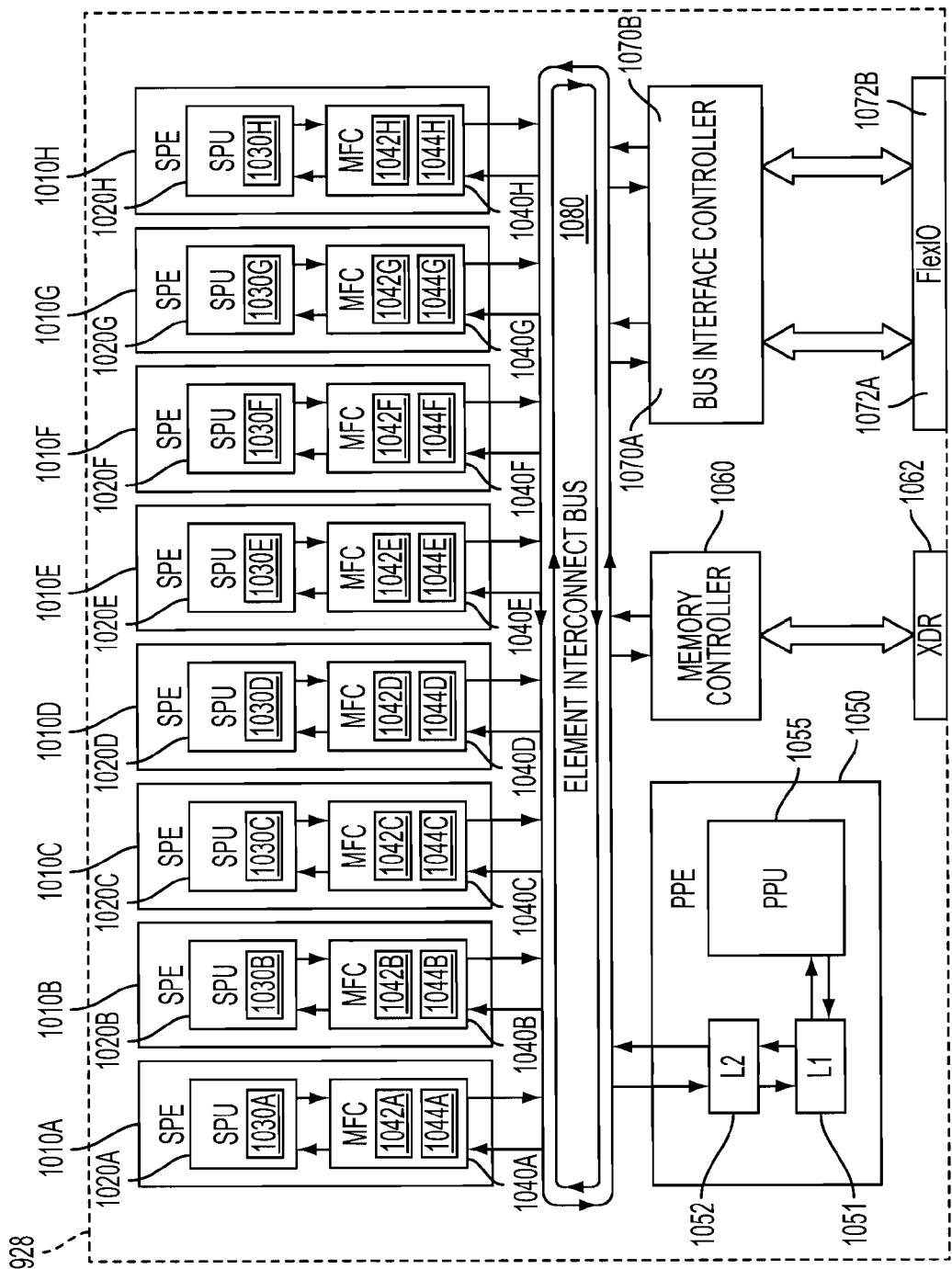
FIG. 10 illustrates additional hardware that may be used to process instructions, in accordance with one embodiment of the present invention.

FIG. 10 illustrates additional hardware that may be used to process instructions, in accordance with one embodiment of the present invention. Cell processor 928 has an architecture comprising four basic components: external input and output structures comprising a memory controller 1060 and a dual bus interface controller 1070A, B; a main processor referred to as the Power Processing Element 1050; eight co-processors referred to as Synergistic Processing Elements (SPEs) 1010A-H; and a circular data bus connecting the above components referred to as the Element Interconnect Bus 1080. The total floating point performance of the Cell processor is 218 GFLOPS, compared with the 6.2 GFLOPs of the Playstation 2 device's Emotion Engine.

The Power Processing Element (PPE) 1050 is based upon a two-way simultaneous multithreading Power 1470 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently each Synergistic Processing Element 1010A-H runs a kernel whose role is to fetch a job, execute it and synchronized with the PPE 1050.

Each Synergistic Processing Element (SPE) 1010A-H comprises a respective Synergistic Processing Unit (SPU) 1020A-H, and a respective Memory Flow Controller (MFC) 1040A-H comprising in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and comprising 256 kB local RAM 1050A-H, expandable in principle to 4 GB. Each SPE gives a theoretical 25.6 GFLOPS of single precision performance. An SPU can operate on four single precision floating point members, four 32-bit numbers, eight 16-bit integers, or sixteen 8-bit integers in a single clock cycle. In the same clock cycle it can also perform a memory operation. The SPU 1020A-H does not directly access the system memory XDRAM 926; the 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the eight SPEs 1010A-H, totaling 12 participants. Participants can simultaneously read and write to the bus at a rate of eight bytes per clock cycle. As noted previously, each SPE 1010A-H comprises a DMAC 1042A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s.

The dual bus interface 1070A,B comprises a Rambus FlexIO® system interface 1072A,B. The interface is organized into 12 channels each being eight bits wide, with five paths being inbound and seven outbound. This provides a theoretical peak bandwidth of 62.4 GB/s (36.4 GB/s outbound, 26 GB/s inbound) between the Cell processor and the I/O Bridge 934 via controller 1070A and the Reality Simulator graphics unit 930 via controller 1070B.

Figure 11:
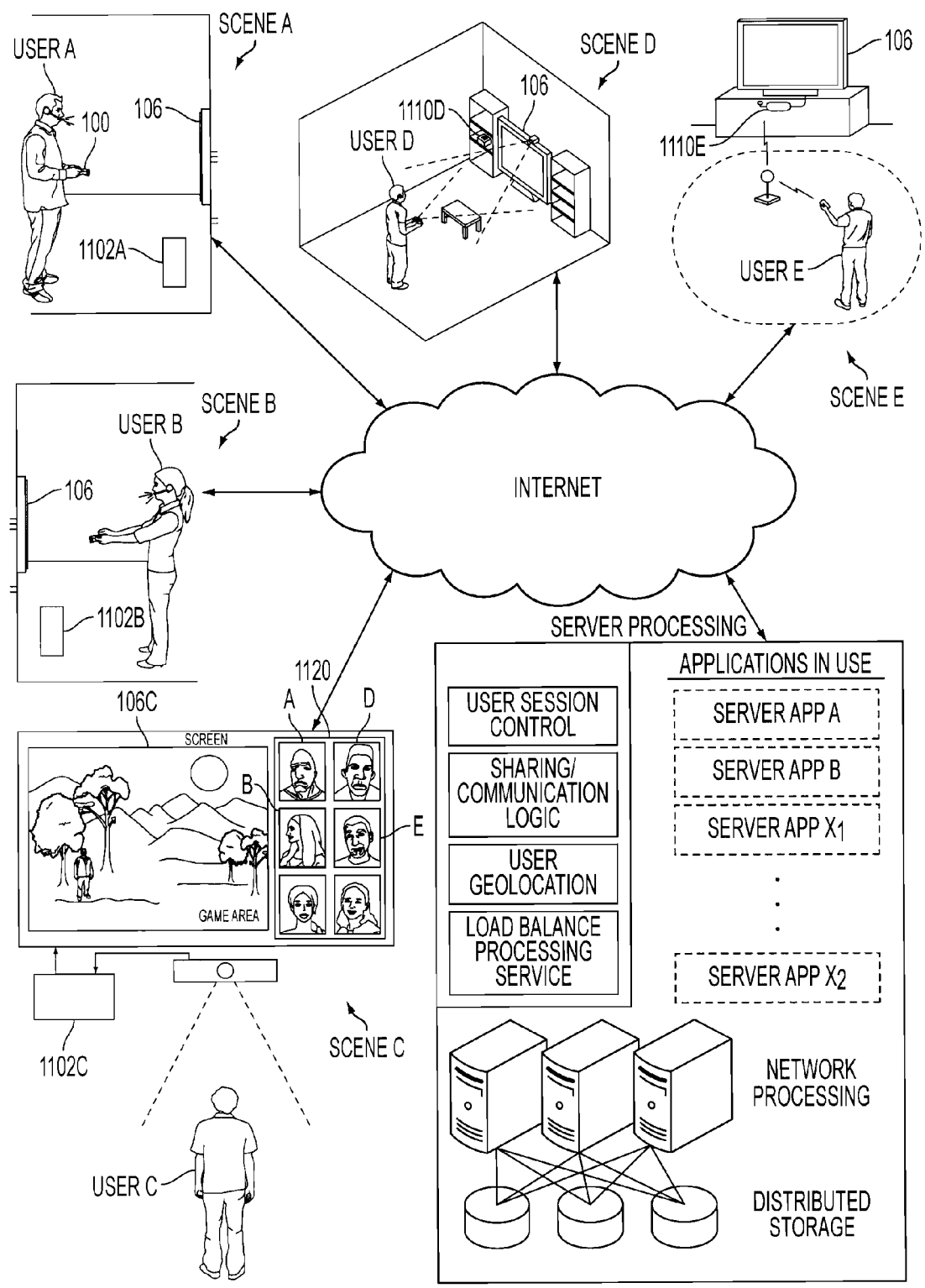
FIG. 11 is an exemplary illustration of scene A through scene E with respective user A through user E interacting with game clients that are connected to server processing via the internet, in accordance with one embodiment of the present invention.

Data sent by the Cell processor 928 to the Reality Simulator graphics unit 930 will typically comprise display lists, being a sequence of commands to draw vertices, apply textures to polygons, specify lighting conditions, and so on. Moreover, embodiments of the present invention provide real-time interactive gaming experiences for users. For example, users can interact with various computer-generated objects in real-time. Furthermore, video scenes can be altered in real-time to enhance the user's game experience FIG. 11 is an exemplary illustration of scene A through scene E with respective user A through user E interacting with game clients 1102 that are connected to server processing via the internet, in accordance with one embodiment of the present invention. As previously discussed, a game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 11, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 11 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 11, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to provide input to a game console through a controller, the controller having a handle with a first end and a second end and a spherical input feature connected to the first end of the handle at a pivot point that is disposed along a length axis of the handle, the method comprising:

detecting an orientation of the controller using motion sensors integrated within the handle of the controller, the detected orientation determining when the controller is to operate in a joystick mode;

detecting sensed contact of the spherical input object to a surface when in the joystick mode, the sensed contact being monitored by a sensor that is in communication with the pivot point;

identifying torque information concerning the spherical input object for movements of the spherical input object relative to the pivot point; and transmitting the torque information to a game console, the torque information identifying rotation and compression of the spherical object that is mapped to direct interactive control of a program executed by a processor of the game console.

2. A method as described in claim 1, further comprising:

detecting tensile force applied to the spherical input feature during movements of the spherical input object relative to the pivot point.

3. A method as described in claim 1, further comprising:

detecting compression force applied to the spherical input feature during movements of the spherical input object relative to the pivot point.

4. A method as described in claim 1, wherein execution through the game console is either providing primary execution locally at the game console, or at a gaming server that communicates processed instructions to the game console for display and local control.

* * * * *